(12) United States Patent
Ryan et al.

(10) Patent No.: US 8,462,268 B2
(45) Date of Patent: Jun. 11, 2013

(54) VIDEO PROCESSOR TIMING GENERATION

(75) Inventors: Seamus Ryan, Nenagh (IE); Weijun Xu, Beijing (CN); Tianjiang Li, Beijing (CN); Wei Che, Beijing (CN); Niall O'Connell, Limerick City (IE)

(73) Assignee: Analog Devices, Inc., Norwood, MA (US)

( * ) Notice: Subject to any disclaimer, the term of this patent is extended or adjusted under 35 U.S.C. 154(b) by 248 days.

(21) Appl. No.: 12/965,351

(22) Filed: Dec. 10, 2010

(65) Prior Publication Data

US 2012/0147267 A1 Jun. 14, 2012

(51) Int. Cl.
| | |
|---|---|
| *H04N 9/475* | (2006.01) |
| *H04N 5/06* | (2006.01) |
| *H03L 7/00* | (2006.01) |
| *H03L 7/06* | (2006.01) |
| *G09G 5/02* | (2006.01) |

(52) U.S. Cl.
USPC ........... 348/512; 348/521; 348/548; 348/542; 348/441; 327/147; 345/698

(58) Field of Classification Search
None
See application file for complete search history.

(56) References Cited

U.S. PATENT DOCUMENTS

| | | | |
|---|---|---|---|
| 6,177,922 B1 * | 1/2001 | Schiefer et al. | 345/698 |
| 6,441,658 B1 * | 8/2002 | Taraci et al. | 327/147 |
| 7,253,842 B2 * | 8/2007 | Louie et al. | 348/542 |
| 7,710,501 B1 * | 5/2010 | Adams et al. | 348/548 |
| 2006/0077288 A1 * | 4/2006 | Wu | 348/441 |

OTHER PUBLICATIONS

International Search Report and Written Opinion dated Feb. 23, 2012, from counterpart international application No. PCT/US2011/062409.

* cited by examiner

*Primary Examiner* — Jefferey Harold
*Assistant Examiner* — Sean Haiem
(74) *Attorney, Agent, or Firm* — Kenyon & Kenyon LLP (57) ABSTRACT

Embodiments of the present invention may provide a clock and timing generation scheme for a video signal processor (e.g., a scaler), which enables fast switching between different input video standards without disturbing the output clock or timing. The scheme also may minimize the number of video frames that are dropped or repeated at the output. This may be achieved by locking the video's output timing to the input timing and also by utilizing a frame buffer to remove instantaneous discontinuities caused when an input is changed.

25 Claims, 6 Drawing Sheets

VIDEO PROCESSOR TIMING GENERATION

FIELD OF INVENTION

The present invention relates to video processors, and more particularly to a video processor timing generation circuit and method that enables seamless fast switching between different input sources.

BACKGROUND

Video resolution is defined by number of pixels per frame. For example, a video signal of resolution of 480 p has 720 active pixels per line and 480 active lines per frame, and a video signal of resolution of 1080 p has 1920 active pixels per line and 1080 active lines per frame. The display frequency or frame rate is defined by the number of frames displayed per second, and the standard display frequencies include 23.9 Hz, 24 Hz, 50 Hz, 59.94 Hz and 60 Hz. Video signals are normally generated by diverse video sources (e.g., video cameras, web cams, digital camcorders, digitized optical pictures) and different video sources typically generate video signals with different resolutions and display frequencies.

Figure 1:
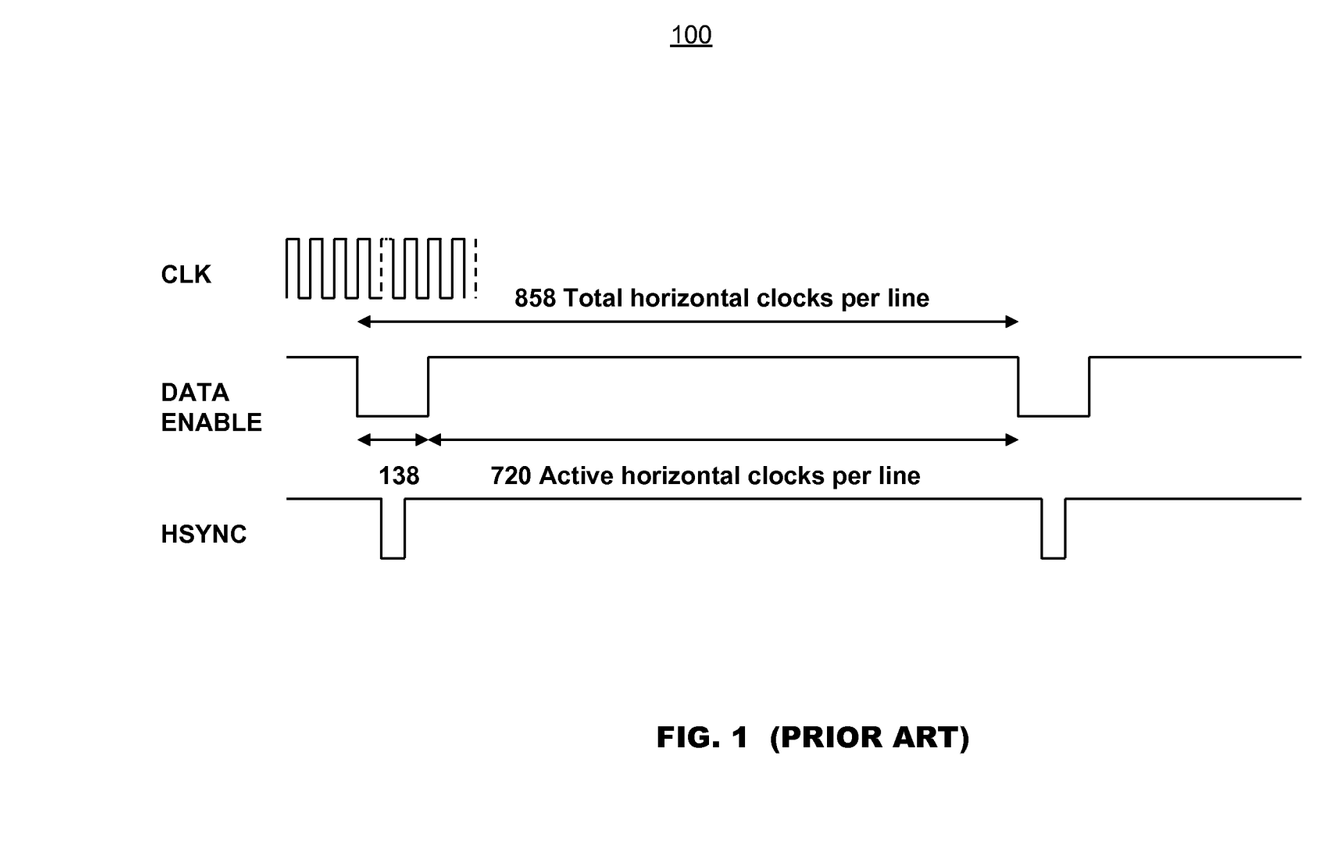
FIG. 1 illustrates horizontal synchronization signals of a prior art video signal.
Figure 2:
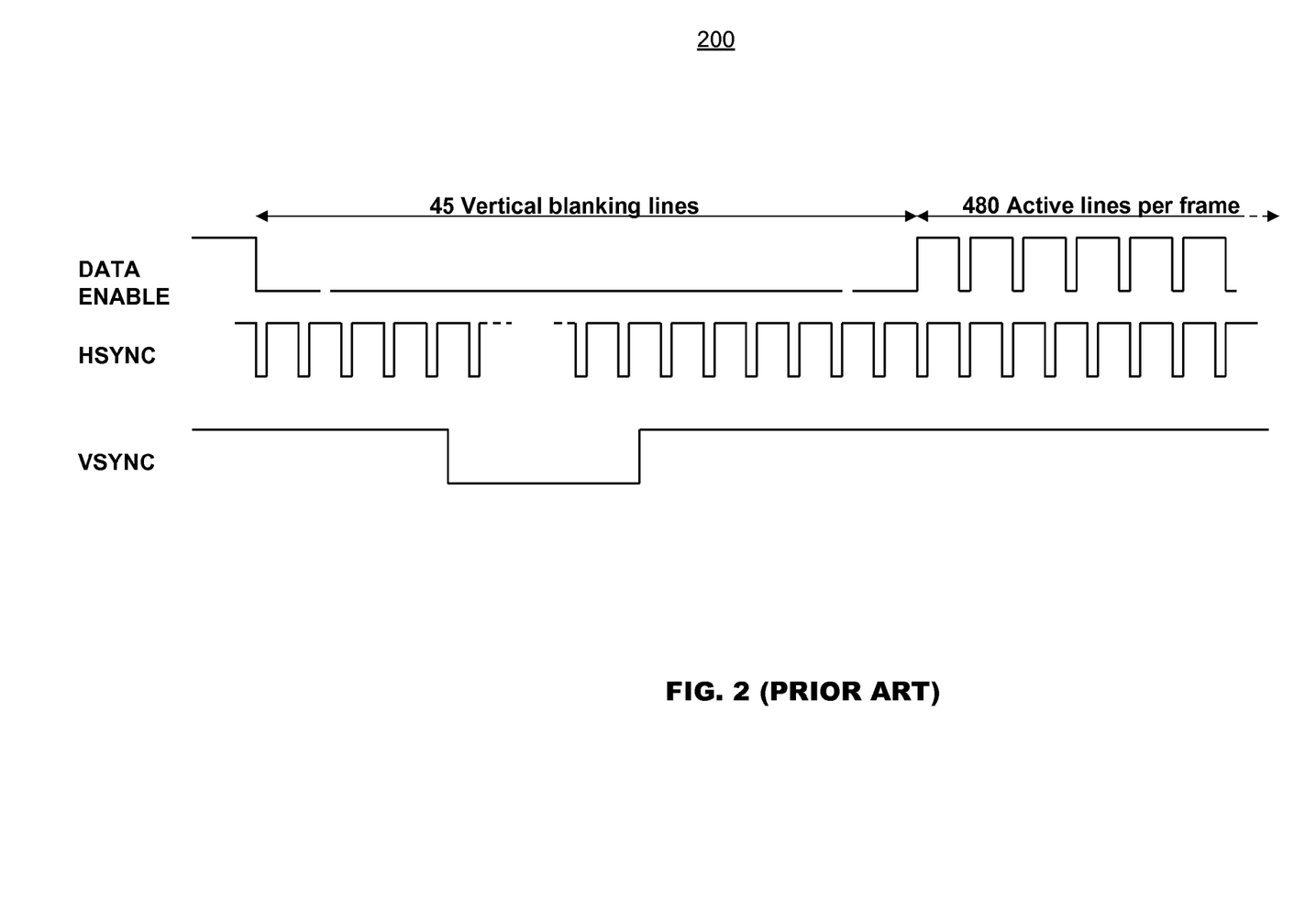
FIG. 2 illustrates vertical synchronization signals of a prior art video signal.

Modern display devices display video one pixel at a time based on a clock cycle. Displaying output video on a screen is analogous to continuously drawing a box from left to right and from top to bottom. The clock signal provides a timing reference for each pixel. Horizontal and vertical synchronization signals are used to indicate the start of each new line and frame respectively. In this analogy, the horizontal sync signal indicates when to jump from right to left (to start the new line) and the vertical sync signal indicates when to jump from the bottom of the box to the top (to start the new frame). For example, FIG. 1 shows the clock signal CLK relative to the horizontal sync signals HSYNC for a video signal of 480 p resolution, and FIG. 2 shows the horizontal sync signals HSYNC relative to the vertical signals VSYNC for the video signal of 480 p resolution. As shown in FIG. 1, each line has 858 total horizontal clocks during a data enable cycle, of which 720 are active horizontal clocks when the data enable signal is active. Further, as shown in FIG. 2, each frame has 525 lines, of which 45 are blanking lines with the data enable signal being non-active and 480 lines are active with the data enable signal turning on periodically.

With the wide availability of the high-definition display devices, a lot of video signals with different resolutions need to be scaled to take advantage of the capability of the display devices (e.g., from 480 p to 720 p or even 1080 p). Further, the display frequencies can also be increased (e.g., from 24 Hz to 60 Hz or even 120 Hz to display smoother motion on moving scenes). A video scaler converts video data from one resolution to another and changes the display frequencies if needed. Both input and output resolutions can be any video or graphics standard. In a typical application, the output video resolution is fixed (determined by the native resolution of the display device) and the input video timing/resolution will change as inputs change. For example, the input is changed from 480 p to 720 p but the output is still fixed at 1080 p.

The video scalers typically transfer video signals one pixel at a time. That is, the scalers input or output one pixel for one clock cycle. Both input and output timing for the scalers also consists of clock, horizontal synchronization (sync), and vertical sync signals, and sometimes other synchronization signals. Because the input and output signal resolutions are different, the input and output are running at different clock speeds (e.g., 480 p at 27 MHz clock, 1080 p at 148.5 MHz clock). However, as the input source or resolution changes it is desirable for the output timing to remain unchanged because a stable output timing base makes it possible for down stream devices to retain lock during input changes and insures that there is minimal disruption to the displayed picture.

In some implementations, the timing signals are generated using simple counters which wrap around when reaching the desired number of samples per line (horizontal sync) and lines per frame (vertical sync). The timing system is complicated by the fact that almost all video standards can operate at two different clock frequencies to accommodate slightly different frame rates of 60 Hz and 59.94 Hz. So, for example, a video signal with 480 active lines per frame and 720 active pixels per line can have a clock frequency of 27 MHz (59.94 Hz) or 27.027 MHz (60 Hz). In either frequency, there is a fixed number of clocks between each horizontal synchronization pulse and also a fixed number of horizontal synchronization pulses between each vertical synchronization pulse per video standard.

The present scaler technology has several problems. For example, the input video (resolution or source) can be changed, but the output resolution is to be kept constant. If the output video timing is directly phase and frequency locked to the input timing, the discontinuity caused by changing the input will be passed directly to the output. This discontinuity will adversely affect downstream video sinks (i.e. display devices) resulting in the final display being disrupted or blanked for a period of time. However, if the scaler output timing is free running and not locked to the input, the disruption of output timing is eliminated but this will lead to frames of video data being either dropped or repeated to compensate for the frequency differences between input and output timing. Video frame drops and repeats cause unsightly artifacts on the final displayed picture such a stuttering motion. Further to these problems, the accuracy of the source generated clock will also vary slightly from source to source such that an exact 27 MHz or 27.027 MHz is extremely unlikely. Therefore, there is a need in the art for providing a video signal processor that can seamless fast switch between different input sources.

DETAILED DESCRIPTION

Embodiments of the present invention may provide a clock and timing generation scheme for a video signal processor (e.g., a scaler), which enables fast switching between different input video standards without disturbing the output clock or timing. The scheme also may minimize the number of video frames that are dropped or repeated at the output. This may be achieved by locking the video's output timing to the input timing and also by utilizing a frame buffer to remove instantaneous discontinuities caused when an input is changed.

Figure 3:
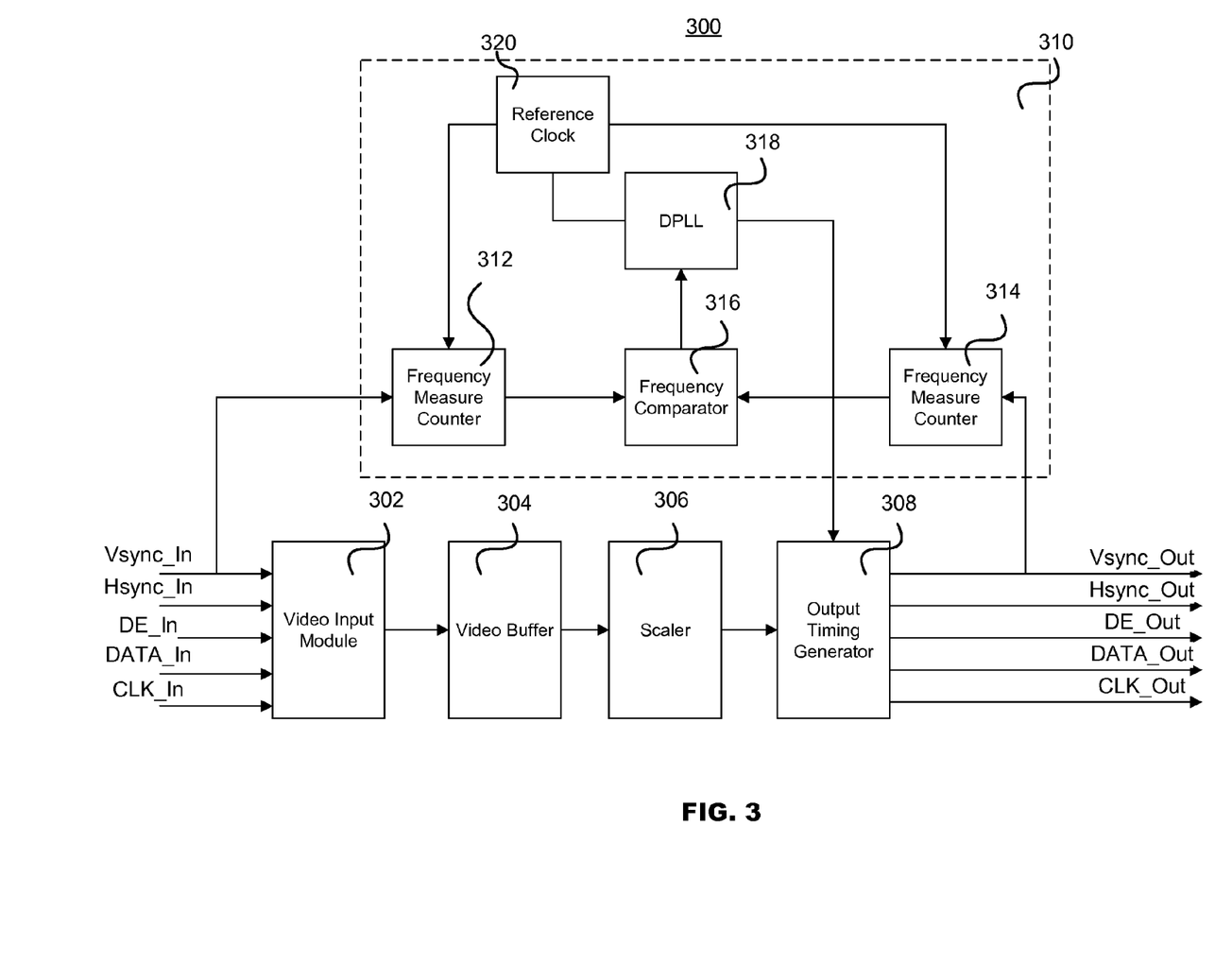
FIG. 3 illustrates a signal processing circuit according to an embodiment of the present invention.

FIG. 3 illustrates a signal processor 300 according to an embodiment of the present invention. The signal processor 300 may comprise a video input module 302, a video buffer 304, a scaler 306, an output timing generator 308 and a frequency matching circuit 310. The video input module 302 may receive an input video signal (e.g., DATA_In) and synchronization signals (e.g., Hsync_In, Vsync_In, DE_In, CLK_In). The video input module 302 may transmit the received input video signal to the video buffer 304. The scaler 306 may read the video signal from the video buffer 304 and scale the input video signal to generate an output video signal at a target resolution. The output timing generator 308 may generate the output timing signals, such as CLK_Out, DE_Out, Vsync_Out and Hsync_Out signals for the output video signal. The output timing signals may be adjusted according to the frequency matching circuit 310.

The frequency matching circuit 310 may comprise a first frequency measure counter 312, a second frequency measure counter 314, a frequency comparator 316, a digital phase lock loop (DPLL) 318 and a reference clock 320. In one embodiment, the first and second frequency measure counters 312 and 314 may count number of clock cycles for the input and output video signal respectively using a pre-determined number of synchronization signal edges (e.g., two consecutive vertical synchronization signal edges). Both the first frequency measure counter 312 and the second frequency measure counter 314 may use a reference clock signal provided by the reference clock 320. The two counted numbers may be compared by the frequency comparator 316 and provided to the DPLL 318, which may generate an output clock signal using the reference clock 320.

In one embodiment, the output clock signal may be provided by the DPLL 318 to the output timing generator 308 to be used as the output clock for the output video signal. The output clock may be initially set to a predetermined frequency based on the output standard to be generated. Theoretically, there may be a fixed relationship between the input and output clock frequencies for some video resolution conversions, however in practice there likely will be some inaccuracy in both the input and output clock as mentioned above. These variations can be caused by many factors such as crystal reference accuracy, poor input video sources, temperature variations, etc, as well as the 59.95/60 Hz uncertainty. In one embodiment, the output clock may be varied slightly to compensate for the inaccuracies in both input and output clocks. This may insure that the correct number of pixels per line and also lines per frame are produced while also tracking the input.

Video data that arrives at the input to the scaler 306 may be written to the video buffer 304 using the input clock. Differences in this clock from the standard frequency may cause pixels to be written to the memory buffer either too quickly or too slowly relative to the defined ideal rate. The same is true of the output clock on the read side of the buffer 304. To avoid the write and read pointers colliding in the buffer 304 and causing errors in the data stream output video, frames may be either repeated or dropped. Repeated and dropped frames cause undesirable artifacts on the displayed output picture for moving scenes. In one embodiment, the repeated and dropped frames may be effectively eliminated by adjusting the output clock frequency to better frequency lock it to the input timing.

In one embodiment, the output clock may be adjusted so that the frame rate of the output data matches the frame rate of the input data. For example, if the input is 60 Hz, output frame rate may also be 60 Hz; if the input is 24 Hz, then the output frame rate may also be 24 Hz. That is, there may be a 1:1 ratio between the input and output frames (e.g., one frame of video at the scaled resolution is output for each input frame of video).

In another embodiment, the output frame rate may be a desired frame rate (e.g., 60) no matter what is the input frame rate (e.g., 24 Hz). In this embodiment, the scaler will not only scale each frame, but also may generate additional frames (e.g., repeat preceding or succeeding frames, or interpolating from adjacent frames to create additional frames).

Figure 4:
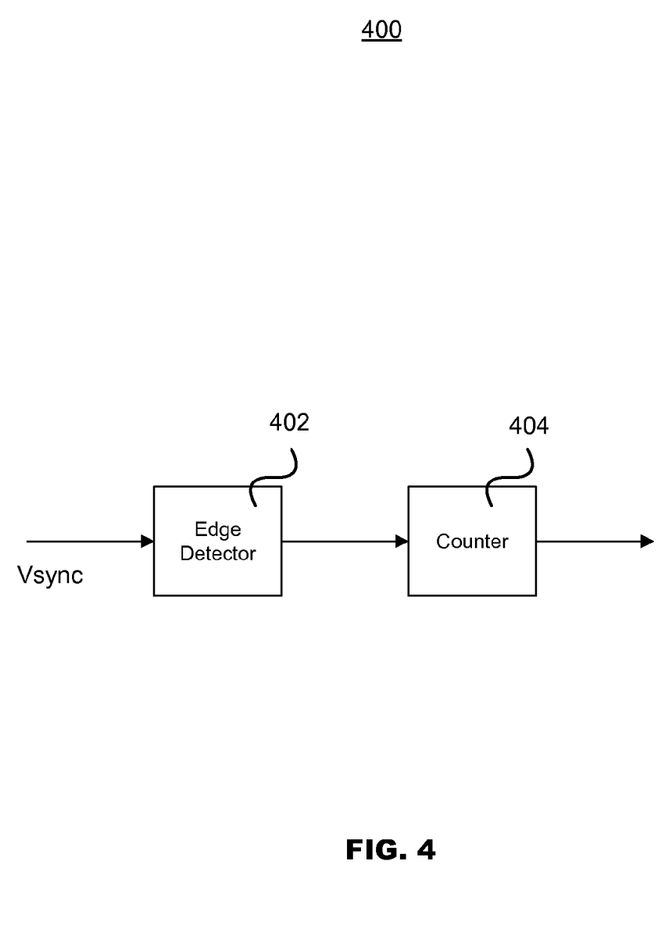
FIG. 4 illustrates a frequency measure counter according to an embodiment of the present invention.

In one embodiment, the frequency (e.g., frame rate) may be tracked by measuring the input and generated output vertical synchronization frequencies using the reference clock 320 (e.g., a crystal oscillator). A simple counter that is reset on synchronization signal edges may be used to perform the measurement. FIG. 4 illustrates a frequency measure counter 400 according to an embodiment of the present invention. The frequency measure counter 400 may comprise an edge detector 402 and a counter 404. The edge detector 402 may reset on the synchronization signal edges and the counter 404 may count the number of the reference clock cycles between a specific number of edges (e.g., two consecutive synchronization signal edges).

In one embodiment, each of the first and second frequency measure counters 312 or 314 may be a frequency measure counter 400. The values of both counters 312 and 314 may be latched when the sync edge arrives. The frequency comparator 316 may subtract one from the other to obtain the frequency delta. This frequency delta is gained and limited before being accumulated by an accumulator of the frequency comparator 316. The accumulated result is then added to the default clock generation value to produce the offset clock frequency. The accumulation will continue to increase or decrease until the error between the frame rates is reduced to zero. For this embodiment, the output timing may be frequency locked to the input timing across the frame buffer.

When an input change occurs, the output timing continues to be generated uninterrupted. In one embodiment, the input video standard may be a programmable input signal. If the programmed input video standard is updated the accumulate offset will be reset to zero and the loop will begin lock to the new frequency error between the input and output timing. If the programmed input standard is not changed the loop will track the newly measured frequency error from its previous position without being reset. This means that when an input is changed between a 59.94 Hz and 60 Hz version of the same standard, the output will transition seamlessly between the two without disturbing the output timing. In either case only the output clock will be altered, the horizontal and vertical synchronization signals will continue to be generated uninterrupted. This scheme therefore may achieve the goal of uninterrupted output timing combined with negligible frame repeat or drops.

In one embodiment, the DPLL 318 may be set up in an open loop mode. A period value may be sent to the DPLL 318 along with an update strobe. When the strobe is toggled the period value is captured and the output clock frequency may be updated. The period to the DPLL 318 may be slew rate limited. That is, the rate of change of the number provided to the DPLL may be limited (e.g. it cannot change by large amounts quickly). For example, to move from 27 Mhz to 28 Mhz, the change would happen slowly: 27.0001->27.0002-> 27.0003 . . . ->28. If it were not slew rate limited, the change from 27->28 could occur in one step. Because the change is sew rate limited, the effective jitter on the output clock from the change may be negligible. When the input to the scaler 306 is changed the error between the input and output vertical syncs may be detected and the frequency comparator 316 may begin tracking the new frequency error. During this tracking period the output timing will continue uninterrupted with only minor increases or decreases in the output clock.

In one embodiment, the video buffer 304 may be a memory buffer external to the scaler 306 to de-couple the output signal from the input signal. This may overcome the shortcomings of prior art technology of locking the output timing directly to the input timing, which suffers discontinuities in output signals when the input changes and is not robust to handle flawed input timing (e.g., the input signal frequency is not exactly a standard frequency). Moreover, the video buffer 304 may be placed before the scaler 306 and provide further advantages. Because the resolution of the input video signal generally is lower than the scaled output video signal, the video buffer 304 may require less bandwidth and memory size.

In one embodiment, the scaler 306 and the output timing generator 308 may work closely together as the output data must correspond with the timing and vice versa. Thus, they may be either side by side or the timing generator 308 may feed into the scaler 306 as well as output the timing signals. The scaler 306 may output the data that matches the timing.

Figure 5:
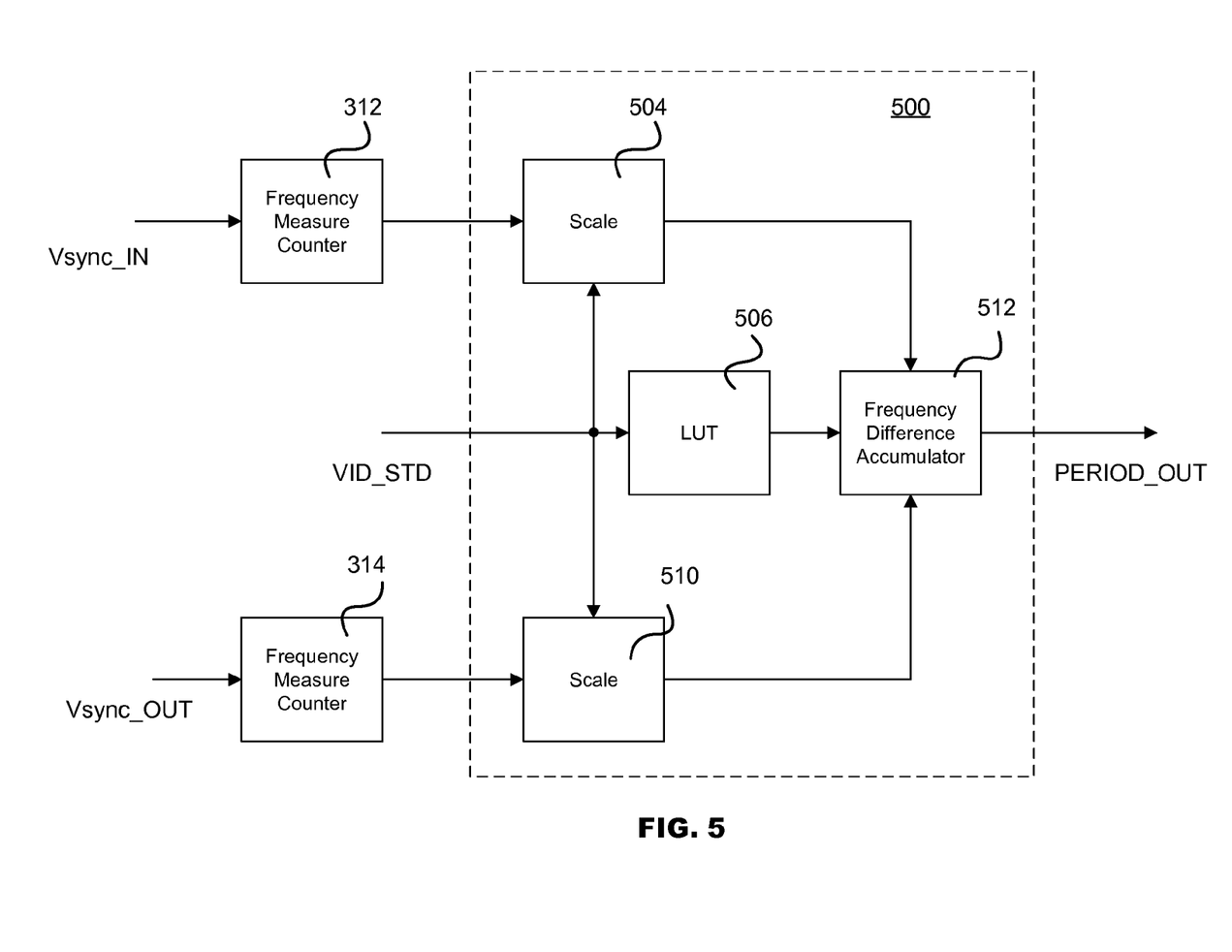
FIG. 5 illustrates a frequency comparator according to an embodiment of the present invention.

FIG. 5 illustrates a frequency comparator 500 according to an embodiment of the present invention. The frequency comparator 500 may comprise two scale blocks 504 and 510, a look up table (LUT) 506 and a frequency difference accumulator 512. The scale blocks 504 and 510 may receive the counted numbers from the frequency measure counters 312 and 314, respectively. The scale blocks 504 and 510 may be used for frame rate conversions as described later. In one embodiment, the input signal (video_standard "VID_STD") to the LUT 506 may be used to select the output frequency. The video standard may be set via an i2c interface (e.g., an externally controlled port) and may be set to any input frame rate, including 23.9, 24, 50, 59.4, 60. The output frequency selected by the LUT 506 may be sent to the frequency difference accumulator 512 and used as the initial output clock frequency, which may used for tracking the input frequency and adjusted according to the frequency matching. The frequency comparator 500 may be used as the frequency comparator 316 in FIG. 3.

In one embodiment, the processor 300 of FIG. 3 may perform frame rate (e.g., display frequency) conversion on the input video signals using the frequency comparator 500. For example, if the input were 24 Hz, the processor 300 may convert it to 60 Hz instead of outputting the standard 24 Hz. So an input video signal of 1080 p 24 Hz may be converted to 1080 p 60 Hz output. In this embodiment, some frames may be repeated. Because 24:60 is 2:5 ratio, so every 2 input frames may need 5 output frames. In one embodiment, the conversion may keep ratio constant (e.g., 2:5). Keeping this ratio constant may also allows other devices to easily convert back to 24 Hz without causing artifacts. This conversion may also work in the opposite direction, for example from 60 Hz input to 24 Hz output.

When performing the frame rate conversion (e.g., from 24 Hz to 60 Hz), the measured values may be scaled before they can be compared. The scale blocks 504 and 510 may be used to perform the scaling. If there is no frame rate conversion, the scale factors for the scale blocks 504 and 510 may be set to 1:1. Using the example of 24 Hz to 60 Hz conversion, when the Frequency Measure Counter 302 counts 2000, the Frequency Measure Counter 314 may count 801. The input side may be scaled by the scale block 504 by a factor of 2: 2000×2=4000; the output side may be scaled by the scale block 508 by a factor of 5: 801×5=4005. Thus the frequency difference accumulator 512 may get an error=4000−4005=−5. Therefore, the frequency difference accumulator 512 may adjust the output clock frequency to reduce it until the output frequency counter measures 800, then the input and output will be locked together and the ratio will remain 2:5 as desired.

In one embodiment, the scale blocks 504 and 510 also need to know both the input and output video standards to decide what scale factor to use on the input and output measurements. For example if the input is 60 Hz and the output is 59.94 then the scale factor may be 1:1, if the input is 24 Hz and the output is 60 Hz then the scale factor may 2:5 (e.g., the input counted number is scaled by 2 and the output counted number by 5 so they can be compared).

Figure 6:
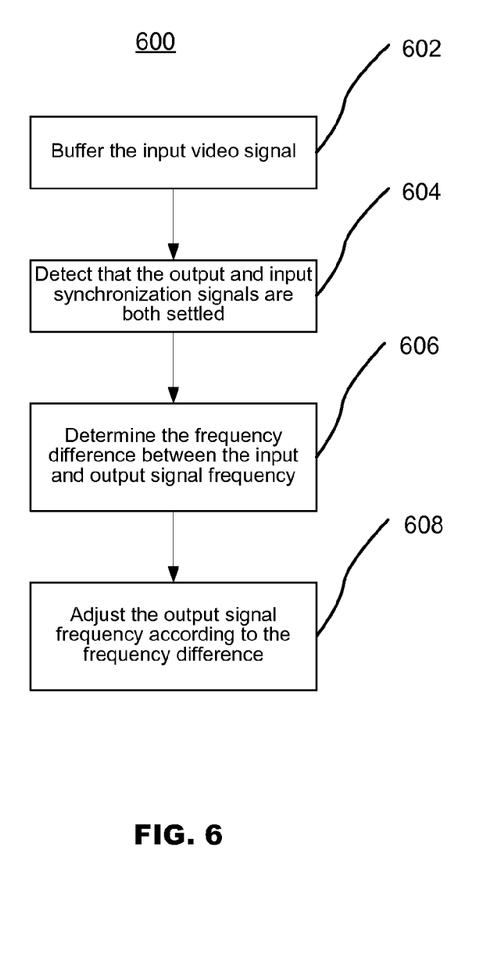
FIG. 6 illustrates a flowchart depicting a process to match the output frequency to the input frequency according to an embodiment of the present invention.

FIG. 6 illustrates a flowchart depicting a process 600 to match the output frequency to the input frequency according to an embodiment of the present invention. At block 602, a signal processor according to the present invention may buffer the input video signal. As described above, the buffer may de-couple the output video signal from the input video signal to reduce any adverse impact on the output video signal when the resolution and or frame rate of the input video signal changes. At block 604, a signal processor according to the present invention may detect the output and input synchronization signals may be settled. The synchronization signals may be vertical, horizontal synchronization signals or clock signals. At block 606, the signal processor may determine the frequency difference between the output and input signals. For example, the processor 300 as described above may use the frequency matching circuit 310 to determine the frequency difference (e.g., frequency delta). At block 608, the signal processor may adjust the output synchronization signal according to the frequency difference.

Several embodiments of the present invention are specifically illustrated and described herein. However, it will be appreciated that modifications and variations of the present invention are covered by the above teachings and within the purview of the appended claims without departing from the spirit and intended scope of the invention.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

We claim:

1. A signal processor, comprising:
    a video memory to buffer an input video signal;
    a scaler to read the input video signal from the video memory and to scale the input video signal to generate an output video signal at a target resolution;
    an output timing generator to generate timing signals for the output video signal; and
    a frequency matching circuit to adjust the generated timing signals to match the input timing signals;
    wherein the frequency matching circuit comprises a first and second counter that count, independently from each other, the number of reference clock cycles in a vertical synchronization period of the input video signal and output video signal respectively.

2. The signal processor of claim 1, wherein each of the first and second counters comprises an edge detector that is reset by a signal edge.

3. The signal processor of claim 2, wherein the signal edge is vertical synchronization signal edge for the input video signal and output video signal respectively.

4. The signal processor of claim 3, wherein the values of the first and second counters are latched when the signal edge arrives.

5. The signal processor of claim 4, further comprising a frequency comparator, wherein the frequency comparator compares the difference between the latched values of the first and second counters to generate a frequency delta.

6. The signal processor of claim 5, wherein the frequency matching circuit further comprises a digital phase lock loop (DPLL) in an open loop mode, the DPLL sets an output frequency.

7. The signal processor of claim 5, wherein the frequency comparator comprises a look up table (LUT), the LUT sets an output frequency according to an output standard.

8. The signal processor of claim 5, wherein the scaler performs frame rate conversion on the input video signal, the frequency comparator comprises a first and second scale blocks to scale the latched values of the first and second counters respectively according to input and output video standards.

9. The signal processor of claim 5, wherein the frequency delta is gained and limited before being accumulated by an accumulator of the frequency comparator, the accumulated result is added to default clock generation value to produce an offset clock frequency, the accumulation continues until the error between the delta is reduced to zero to lock the output frequency to the input frequency.

10. A method to lock an output clock of a signal processor to an input clock, comprising:
buffering an input video signal to de-couple an output video signal from the input video signal;
detecting synchronization signals of output and input video signals being settled;
determining the frequency difference between the output clock and input clock; and
adjusting the output clock according to the frequency difference to lock the output clock to the input clock;
wherein the signal processor comprises a frequency matching circuit that includes a first and second counter that count, independently from each other, the number of reference clock cycles in a vertical synchronization period of the input video signal and output video signal respectively.

11. The method of claim 10, wherein each the first and second counters comprises an edge detector that is reset by a signal edge.

12. The method of claim 11, wherein the signal edge is vertical synchronization signal for the input video signal and output video signal respectively.

13. The method of claim 12, wherein the values of the first and second counters are latched when the signal edge arrives.

14. The method of claim 13, wherein the signal processor further comprises a frequency comparator, wherein the frequency comparator compares the difference between the latched values of the first and second counters to generate a frequency delta.

15. The method of claim 14, wherein the frequency matching circuit further comprises a digital phase lock loop (DPLL) in an open loop mode, the DPLL sets an initial output frequency.

16. The method of claim 14, wherein the frequency comparator comprises a look up table (LUT), the LUT sets an initial output frequency according to an output standard.

17. The method of claim 14, wherein the signal processor performs frame rate conversion on the input video signal, the frequency comparator comprises a first and second scale blocks to scale the latched values of the first and second counters respectively according to input and output video standards.

18. The method of claim 14, wherein the frequency delta is gained and limited before being accumulated by an accumulator of the frequency comparator, the accumulated result is added to default clock generation value to produce an offset clock frequency, the accumulation continues until the error between the delta is reduced to zero to lock the output frequency to the input frequency.

19. A signal processing pipeline, comprising:
a video memory to buffer an input video signal;
a signal processor to read the input video signal from the video memory and to process the input video signal to generate an output video signal;
a frequency matching circuit to adjust an output clock signal according to an input clock signal; and
an output timing generator to generate timing signals based on the output clock signal;
wherein the signal processor is a scaler and the frequency matching circuit comprises a first and second counter that count, independently from each other, the number of reference clock cycles in a vertical synchronization period of the input video signal and output video signal respectively.

20. The signal processing pipeline of claim 19, wherein each of the first and second counters comprises an edge detector that is reset by a signal edge, and the signal edge is vertical synchronization signal edge for the input video signal and output video signal respectively.

21. The signal processing pipeline of claim 20, wherein the values of the first and second counters are latched when the signal edge arrives.

22. The signal processing pipeline of claim 21, further comprising a frequency comparator, wherein the frequency comparator compares the difference between the latched values of the first and second counters to generate a frequency delta.

23. The signal processing pipeline of claim 22, wherein the frequency matching circuit further comprises a digital phase lock loop (DPLL) in an open loop mode, the DPLL sets an output frequency according to a look up table (LUT) selection based on an output video standard.

24. The signal processing pipeline of claim 23, wherein the signal processor is a scaler that performs frame rate conversion on the input video signal, the frequency comparator comprises a first and second scale blocks to scale the latched values of the first and second counters respectively according to input and output video standards.

25. The signal processing pipeline of claim 22, wherein the frequency delta is gained and limited before being accumulated by an accumulator of the frequency comparator, the accumulated result is added to default clock generation value to produce an offset clock frequency, the accumulation continues until the error between the delta is reduced to zero to lock the output frequency to the input frequency.

* * * * *